US011620797B2

United States Patent
Bryant et al.

(10) Patent No.: US 11,620,797 B2
(45) Date of Patent: Apr. 4, 2023

(54) ELECTRONIC USER INTERFACE WITH AUGMENTED DETAIL DISPLAY FOR RESOURCE LOCATION

(71) Applicant: BANK OF AMERICA CORPORATION, Charlotte, NC (US)

(72) Inventors: Matthew K. Bryant, Gastonia, NC (US); Regina Yee Cadavid, San Gabriel, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/394,790

(22) Filed: Aug. 5, 2021

(65) Prior Publication Data
US 2023/0039659 A1    Feb. 9, 2023

(51) Int. Cl.
| | |
|---|---|
| G06T 19/00 | (2011.01) |
| G06F 3/048 | (2013.01) |
| G06F 3/04812 | (2022.01) |
| G06F 3/04815 | (2022.01) |
| G06F 21/31 | (2013.01) |
| G06V 10/44 | (2022.01) |
| G06N 3/02 | (2006.01) |
| G06N 20/00 | (2019.01) |

(52) U.S. Cl.
CPC ............ *G06T 19/006* (2013.01); *G06F 3/048* (2013.01); *G06F 3/04812* (2013.01); *G06F 3/04815* (2013.01); *G06F 21/31* (2013.01); *G06N 3/02* (2013.01); *G06N 20/00* (2019.01); *G06V 10/44* (2022.01)

(58) Field of Classification Search
None
See application file for complete search history.

(56) References Cited

U.S. PATENT DOCUMENTS

| | | | |
|---|---|---|---|
| 6,803,928 B2 | 10/2004 | Bimber et al. | |
| 7,215,322 B2 | 5/2007 | Gene et al. | |
| 7,761,908 B2 * | 7/2010 | Yokoyama | G06F 21/31 726/4 |
| 8,046,719 B2 | 10/2011 | Skourup et al. | |
| 8,963,956 B2 | 2/2015 | Latta et al. | |
| 9,317,972 B2 | 4/2016 | Forutanpour et al. | |
| 9,674,419 B2 | 6/2017 | Sexton | |
| 9,726,896 B2 | 8/2017 | Von Und Zu Liechtenstein | |
| 10,203,762 B2 | 2/2019 | Bradski et al. | |

(Continued)

OTHER PUBLICATIONS

Na Liu, Yi Yuan, Lihong Wan, Hong Huo, Tao Fang, "A Comparative Study for Contour Detection Using Deep Convolutional Neural Networks", 2018, ICMLC 2018: Proceedings of the 2018 10th International Conference on Machine Learning and Computing, pp. 203-208, https://doi.org/10.1145/3195106.3195145 (Year: 2018).*

*Primary Examiner* — Michael J Cobb
(74) *Attorney, Agent, or Firm* — Moore & Van Allen PLLC; Nicholas C. Russell

(57) ABSTRACT

With the advent of augmented reality devices becoming increasingly prevalent, accessible, and cross-compatible, there is an opportunity to leverage the capabilities of such devices in order to streamline workflow and information access in number of contexts. The present invention provides an integrated, dynamic system for leveraging the capabilities of augmented reality systems in order to provide users with useful or critical information in a dependable, seamless, and secure manner.

17 Claims, 6 Drawing Sheets

(56) References Cited

U.S. PATENT DOCUMENTS

| | | | |
|---|---|---|---|
| 10,601,778 B2* | 3/2020 | Fields | H04L 43/0876 |
| 10,771,350 B2 | 9/2020 | Kritzler | |
| 10,771,512 B2 | 9/2020 | Escudero et al. | |
| 10,783,682 B2 | 9/2020 | Dotterweich et al. | |
| 10,885,530 B2 | 1/2021 | Mercury et al. | |
| 11,107,280 B1* | 8/2021 | Clohset | G06T 17/20 |
| 11,138,436 B2 | 10/2021 | Powderly et al. | |
| 2002/0010734 A1 | 1/2002 | Ebersole et al. | |
| 2008/0229218 A1* | 9/2008 | Maeng | G06F 3/048 |
| | | | 715/808 |
| 2009/0164949 A1* | 6/2009 | Henkin | G06Q 30/02 |
| | | | 715/862 |
| 2010/0162303 A1* | 6/2010 | Cassanova | H04N 5/45 |
| | | | 725/115 |
| 2010/0218228 A1* | 8/2010 | Walter | G06F 16/5854 |
| | | | 725/105 |
| 2012/0069051 A1* | 3/2012 | Hagbi | G06T 19/006 |
| | | | 345/633 |
| 2012/0079431 A1* | 3/2012 | Toso | G06F 16/248 |
| | | | 715/851 |
| 2012/0311342 A1* | 12/2012 | Nuzzi | H04L 63/08 |
| | | | 713/182 |
| 2013/0031202 A1* | 1/2013 | Mick | G06Q 10/20 |
| | | | 709/217 |
| 2013/0186956 A1* | 7/2013 | Ashok | G06K 7/10722 |
| | | | 235/385 |
| 2014/0195675 A1* | 7/2014 | Silver | H04L 65/70 |
| | | | 709/224 |
| 2015/0062123 A1 | 3/2015 | Yuen | |
| 2015/0100498 A1* | 4/2015 | Edwards | G06Q 20/20 |
| | | | 705/72 |
| 2016/0330260 A1* | 11/2016 | Ruge | G06F 3/04812 |
| 2017/0124713 A1* | 5/2017 | Jurgenson | G06V 20/00 |
| 2017/0221272 A1* | 8/2017 | Li | G06T 7/248 |
| 2017/0243352 A1* | 8/2017 | Kutliroff | G06T 19/006 |
| 2017/0323285 A1 | 11/2017 | Xing | |
| 2018/0173323 A1 | 6/2018 | Harvey et al. | |
| 2018/0189549 A1 | 7/2018 | Inomata | |
| 2018/0336334 A1* | 11/2018 | Yadav | G06F 21/6218 |
| 2019/0107991 A1 | 4/2019 | Spivack et al. | |
| 2019/0212909 A1* | 7/2019 | Napier | G06F 3/04883 |
| 2020/0050744 A1* | 2/2020 | Hazan | G06N 20/00 |
| 2020/0322917 A1* | 10/2020 | Rosenberg | G07C 9/00571 |
| 2020/0366670 A1* | 11/2020 | Cordiner | H04W 12/64 |
| 2020/0366720 A1 | 11/2020 | Escudero et al. | |
| 2021/0019935 A1* | 1/2021 | Neulander | G06T 13/20 |
| 2021/0034123 A1* | 2/2021 | Maeng | H02J 7/00034 |
| 2021/0049822 A1 | 2/2021 | Meriaz et al. | |
| 2021/0225052 A1* | 7/2021 | Marzorati | G06N 3/088 |
| 2021/0264686 A1* | 8/2021 | Prunier | G06Q 10/10 |
| 2022/0114183 A1* | 4/2022 | Paul | G06F 16/9024 |

* cited by examiner

ELECTRONIC USER INTERFACE WITH AUGMENTED DETAIL DISPLAY FOR RESOURCE LOCATION

FIELD

The present invention generally relates to systems, products, and methods which utilize augmented reality in an enterprise context.

BACKGROUND

With the advent of augmented reality devices becoming increasingly prevalent, accessible, and cross-compatible, there is an opportunity to leverage the capabilities of such devices in order to streamline workflow and information access in number of contexts. There is a need for an integrated, dynamic, system for leveraging these capabilities in order to provide users with useful or critical information in a dependable, seamless, and secure manner.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for backend resource management simulation and live deployment. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. Generally the invention may comprise the steps of: receiving user interaction data and application data from a user device; based on the user interaction data and application data, determining augmented overlay information for one or more display items; receiving image data from a camera of an augmented reality system; performing contour analysis of the image data received from the camera of the augmented reality system; based on the contour analysis, identifying a perspective of the user with respect to the user device; and transmitting augmented overlay information to the augmented reality system, wherein the augmented overlay information causes the augmented reality system to display overlaid graphical information related to the data on a display of the user device.

In some embodiments, the invention is further configured to determine augmented overlay information for one or more display items based on one or more authentication credentials provided by a user via the user device.

In other embodiments, the invention is further configured to locate a user account associated with an active application session on the user device, and determine one or more permissions for augmented overlay information based on the user account.

In further embodiments, the user interaction data further comprises a cursor location on a display of the user device.

In still further embodiments, the application data further comprises graphical display data.

In other embodiments, the invention is further configured to periodically update the transmitted augmented overlay information at a refresh rate of at least 30 frames per second.

In some embodiments, the invention is the contour analysis is conducted via a convolutional neural network architecture.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
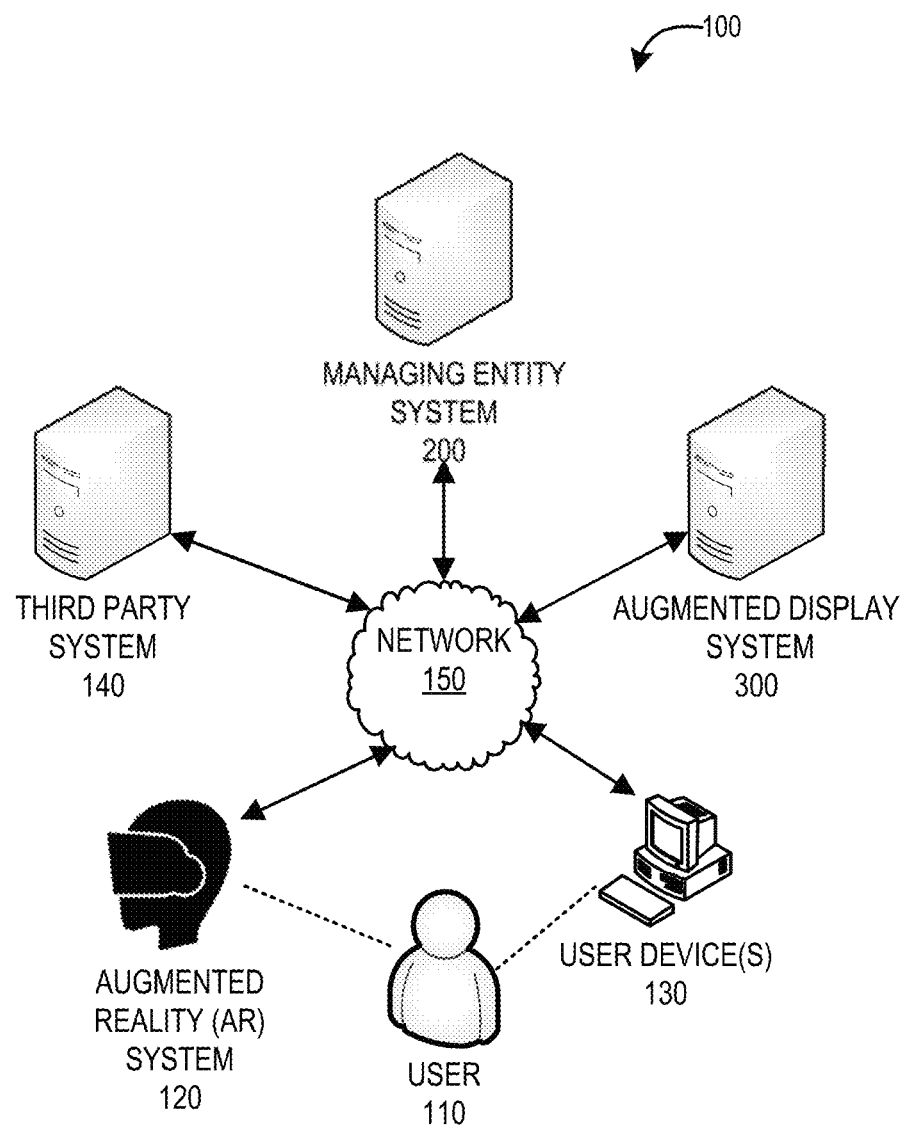
Figure 2:
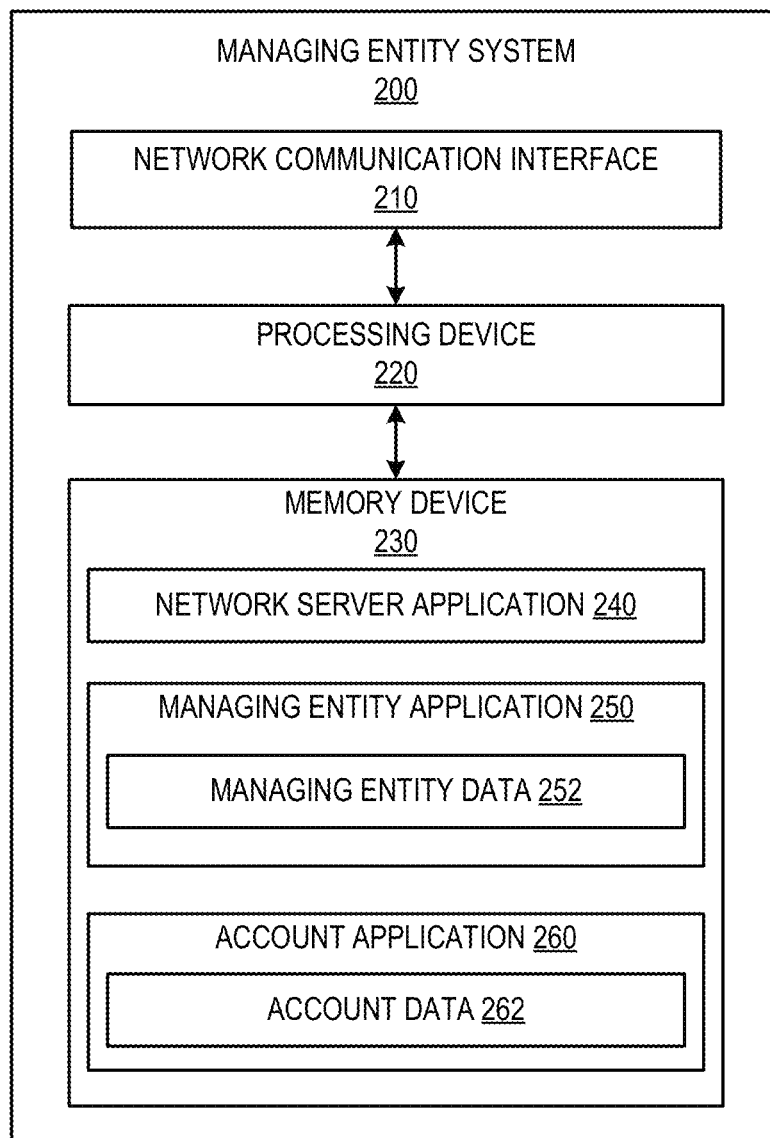
Figure 3:
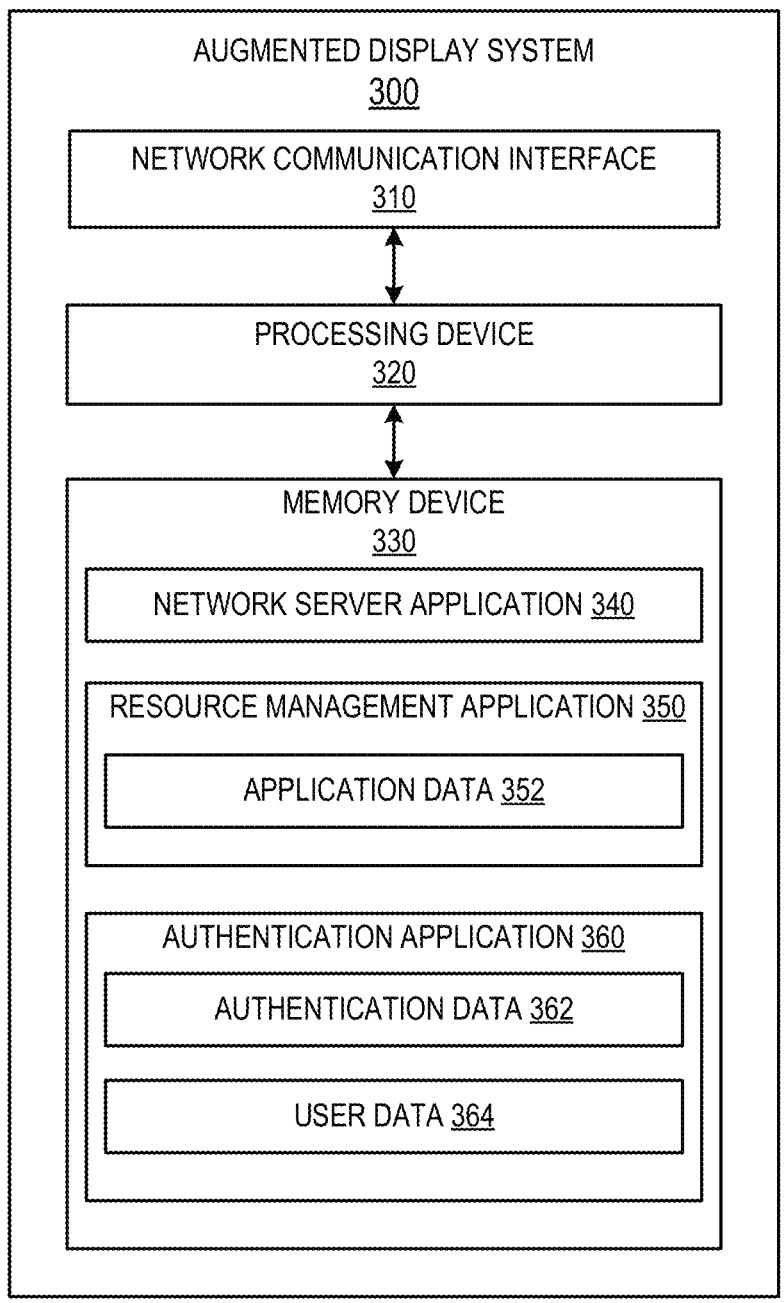
Figure 4:
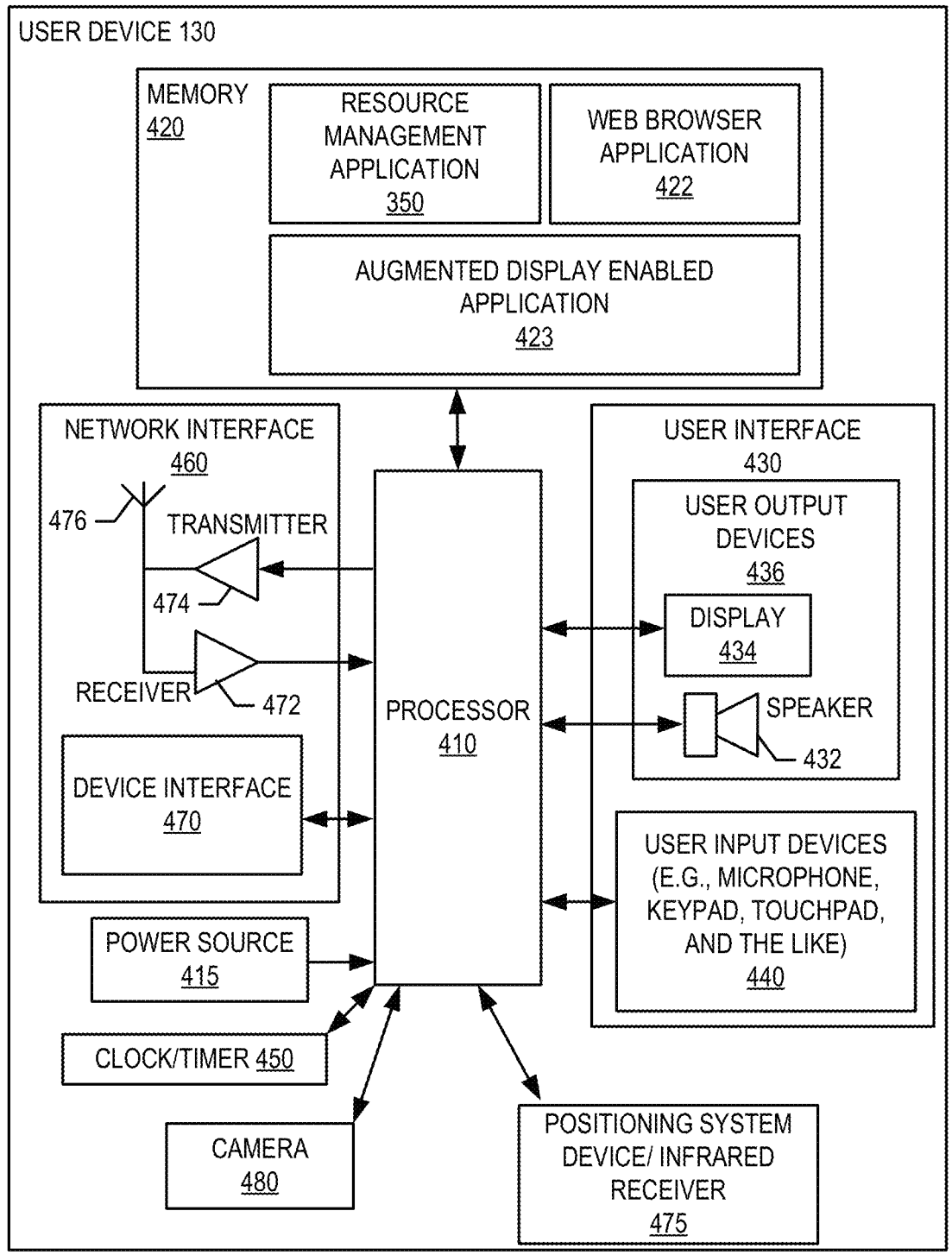
Figure 5:
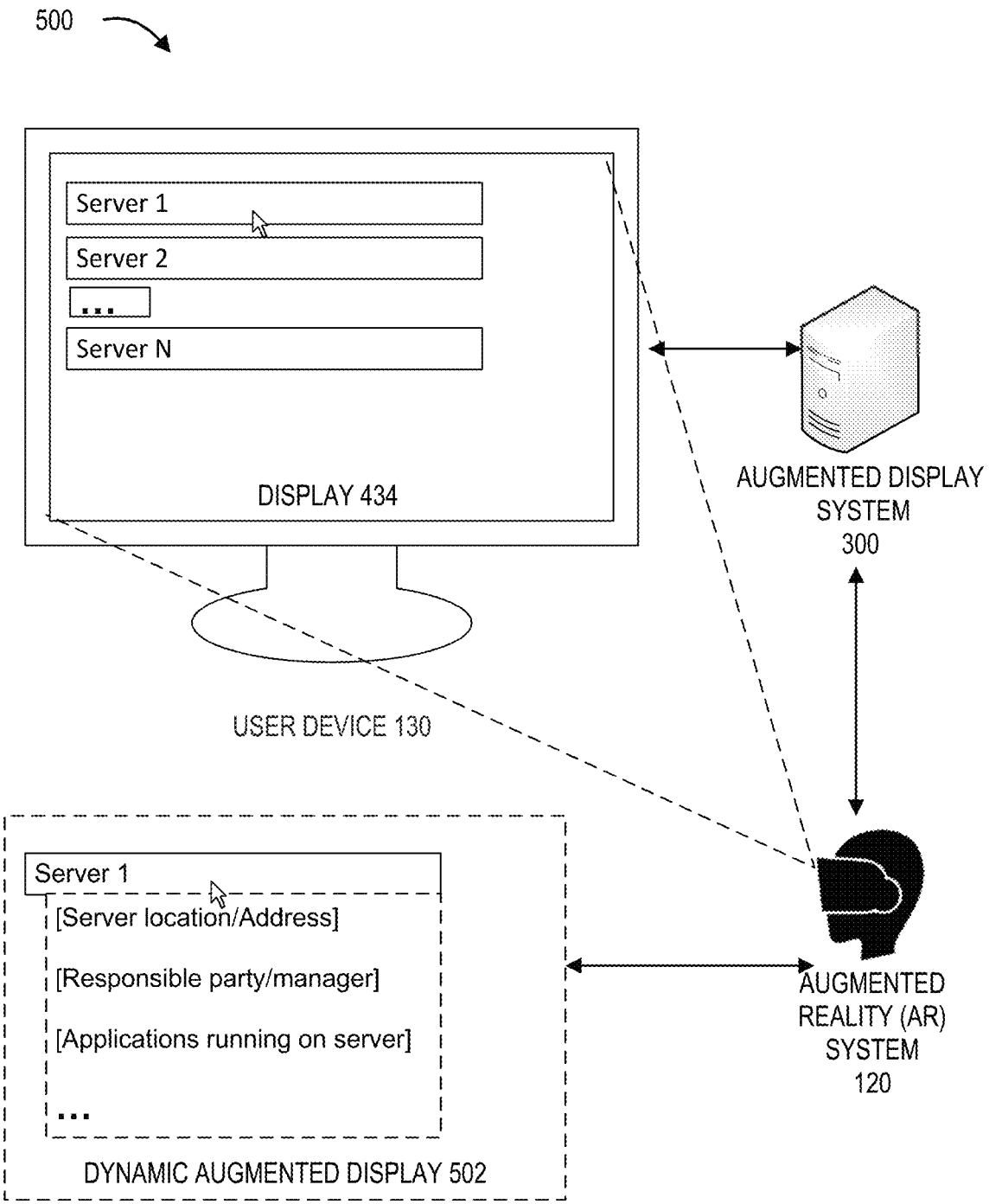
Figure 6:
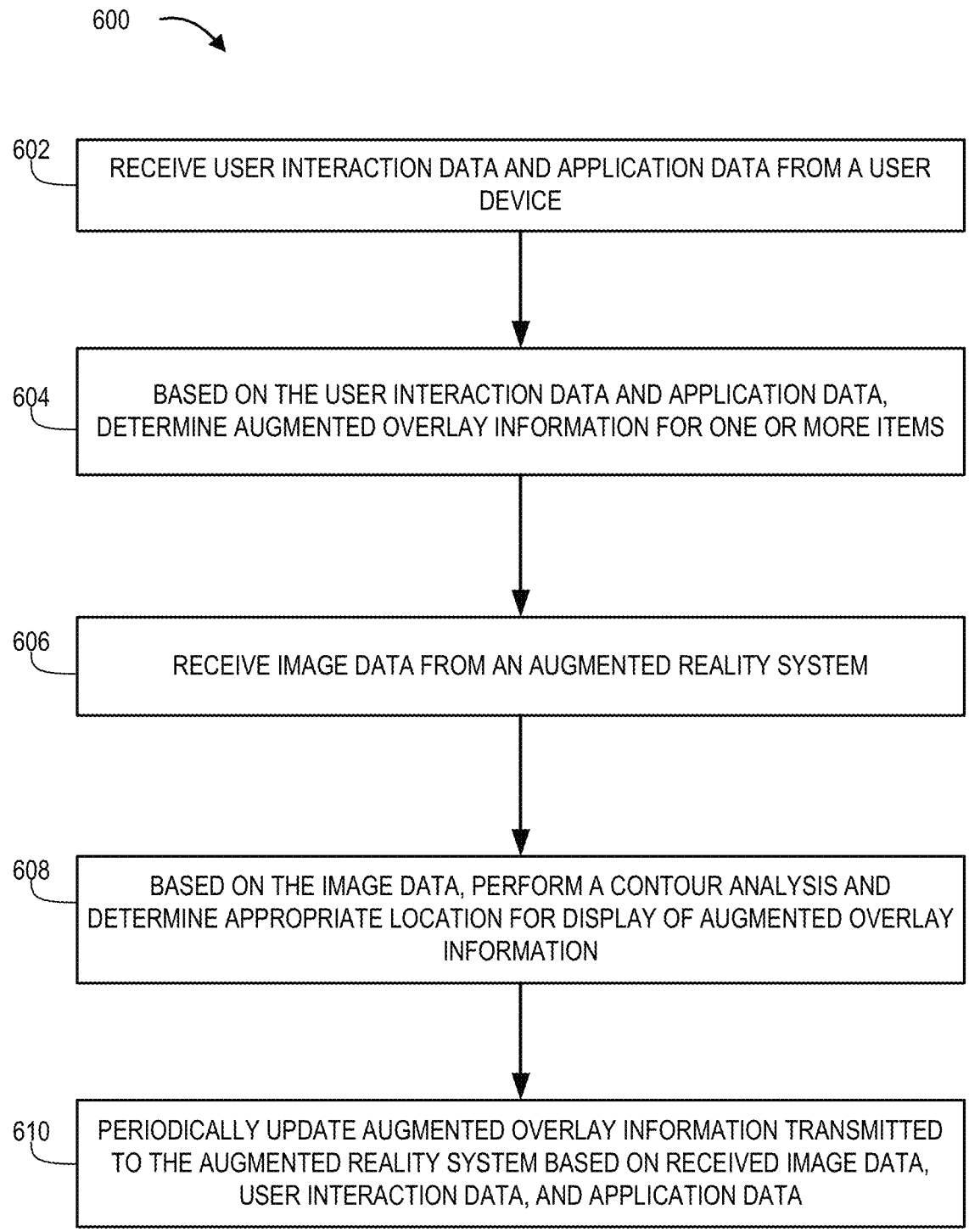

Having thus described embodiments of the invention in general terms, reference will now be made the accompanying drawings, wherein:

FIG. 1 provides a diagram illustrating a system environment, in accordance with an embodiment of the invention;

FIG. 2 provides a block diagram illustrating various components of a managing entity system, in accordance with an embodiment of the invention;

FIG. 3 provides a block diagram illustrating various components of an augmented display system, in accordance with an embodiment of the invention;

FIG. 4 provides a block diagram illustrating various components of a user device, in accordance with embodiments of the invention;

FIG. 5 provides a representative depiction 500 to illustrate a dynamically augmented graphical user interface, in accordance with embodiments of the invention; and FIG. 6 provides a process flow 600 for providing a dynamically augmented display overlay, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

"Entity" or "managing entity" as used herein may refer to any organization, entity, or the like that may have one or more employees or administrators who utilize the described system, or in some cases who are responsible for managing or configuring the described system (e.g., configuring user-specific features, authorized access, or the like). In some embodiments, this may include commercial banks, thrifts, federal and state savings banks, savings and loan associations, credit unions, investment companies, insurance companies, software companies, or the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be a merchant, or other kind of commercial entity.

"Entity system" or "managing entity system" (such as managing entity system 200) as used herein may refer to the computing systems, devices, software, applications, communications hardware, and/or other resources used by the entity to perform the functions as described herein, or used to control or configure the described systems and its components. Accordingly, the entity system may comprise desktop computers, laptop computers, servers, Internet-of-Things ("IoT") devices, networked terminals, mobile smartphones, auxiliary devices, smart devices (e.g., smart watches), network connections, and/or other types of computing systems or devices and/or peripherals along with their associated applications.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an administrator, an engineer, a manager, an analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be representative of a system performing one or more tasks described herein. In still further embodiments, a user may representative of one or more entities given access to the described systems as a service, such as a third party system user, or the like.

As used herein, a "user interface" may be any device or software that allows a user to input information, such as commands or data, into a device, or that allows the device to output information to the user. For example, the user interface may include a graphical user interface (GUI), or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, headset, and/or other user input/output device for communicating with one or more users. In some embodiments, the user interface may be a combination of devices which interface to provide an augmented display experience. For instance, the user may wear a augmented reality (AR) or virtual reality (VR) headset, also referred to herein as the augmented reality (AR) system, which interfaces with one or more other displays or devices in order to provide an overlay of additional information. In some embodiments, the user interface may be tailored to a specific user's role, access permissions, preferences, or the like, as described herein.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning, or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, or the like, and/or the ability and opportunity to access and use the same. Some example implementations herein contemplate a market value of a property held by a user, including property that is stored and/or maintained by a third-party entity. For purposes of this invention, a resource is typically stored in a resource repository—a storage location where one or more resources are organized, stored and retrieved electronically using a computing device.

FIG. 1 provides a diagram illustrating a system environment, in accordance with an embodiment of the invention. As illustrated in FIG. 1, the system environment 100 includes a managing entity system 200, a augmented display system 300, one or more user device(s) 130, an augmented reality (AR) System 120, and one or more third party systems 140. One or more users 110 may also be included in the system environment 100 for representative purposes. In some embodiments, the user(s) 110 of the system environment 100 may be customers of a managing entity that owns or otherwise controls the augmented display system 300 which may, in some embodiments, comprise a financial institution. In other embodiments, the user(s) 110 may be employees of a managing entity.

The managing entity system 200, the augmented display system 300, the one or more user device(s) 130, the AR system 120, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In some embodiments, the AR system 120 may be in connection with the network 150 only when the AR system 120 is at a certain interaction distance from one or more user device(s) 130. In this way, the AR system 120 may interact with the other systems and devices of the environment via one or more user device(s) 130. In other embodiments, the AR system 120 may be in separate connection with the augmented display system 300 or the managing entity system 200, wherein the augmented display system 300 or the managing entity system 200 is transmitting instructions to control the display interface of one or more user device(s) 130 and the AR system 120 in concert.

The managing entity system 200 may be a system owned or otherwise controlled by a managing entity to perform one or more process steps described herein. In some embodiments, the managing entity is a financial institution. In general, the managing entity system 200 is configured to communicate information or instructions with the augmented display system 300, the one or more user device(s) 130, and/or the third party system 140 across the network 150. For example, the managing entity system 200 may maintain account data for the user 110 and therefore may receive a transaction request or other event request associated with the user 110 (e.g., via a third party system 140 comprising a merchant system), compare received information to an internal database of a user associated with the user 110, and transmit authentication or other approval information to the augmented display system 300, the third party system 140, the user device 130, or the like. The augmented display system 300 may be a system owned or controlled by the managing entity and/or a third party that specializes resource management, resource exchange hosting, user authentication systems, data management, systems engineering, IT support, or the like. In some embodiments, at least a portion of the augmented display system 300 may be controlled by or otherwise be a component of the managing entity system 200.

For example, the augmented display system 300 may provide an augmented display for a network architecture system or user account configuration system. In some embodiments, augmented display system 300 provides additional tailored, user-specific detail as a user is viewing a screen. In some embodiments, a user may view an interface which contains a list of server names, and the augmentation may provide metadata or details that a user would typically have to go to an external system to look up, oy would typically need to conduct multiple physical actions (e.g., clicks, right-clicks, taps, or the like) in order to access this additional information. This data could include information like where the server is located, who runs/manages it, what applications are running on the server, or the like. This could include metadata or detailed data that may be useful to a specific user. Each AR system 120, such as specialized glasses, goggles, or the like, may be unique to the user based on the user's role, position, or context. In other embodiments, the user may be required to log into a specific user account associated with the AR system 120 using authentication credentials, and the specific user account may be unique to the user based on the user's role, position, or context. As such, the detailed or metadata displayed may be different based on the user viewing the screen.

The user device 130 may be a system owned or controlled by the managing entity, the user 110, and/or a third party that specializes in providing computers, mobile devices, or the like. In general, the user device 130 is configured to communicate information or instructions with the managing entity system 200, the augmented display system 300, the AR System 120, and/or the third party system 140 across the network 150. For example, the user device 130 may detect an interaction with the AR system 120, extract resource management information (e.g., server location information, or information about other network resources, or the like), transmit the resource information to the managing entity system 200 and/or the augmented display system 300, and receive a confirmation or responses from the augmented display system 300.

The AR system 120 may comprise any device, system, set of devices, or the like that is configured to generate an experience taking place within simulated and immersive environments that can be similar to or completely different from the real world, or may augment how the user 110 perceives the real world, such as augmented reality devices, mixed reality devices, or the like. In preferred embodiments, the AR system 120 is a device which augments reality of the user's surroundings, allowing the user to stay in context of their actual surroundings, view one or more user device 130 screens, or the like, while receiving an overlay of additional (or "augmenting") information as a visual overlay on the user's actual surroundings. In some embodiments, it is conceivable that the AR System 120 may be embedded within, or otherwise be a component of, the user device 130 (e.g., a mobile phone, wearable device, personal computer, or the like). In some embodiments, the AR system 120 may use either headsets or specialized glasses designed to be placed on the head of a user 110, or multi-projected environments to generate realistic images, sounds and other sensations that simulate a virtual or semi-virtual (augmented) environment. For example, the user may wear a headset or pair of glasses with a specialized display resolution which allows the user to easily view the screen at a minimal distance of inches or less. In some embodiments, a virtual reality environment of the user's typical office space, workplace, or the like, may be emulated, allowing the user to virtually visit their place of work remotely. A user 110 using AR equipment is able to look around the artificial world, move around in it, and interact with virtual features or items. In preferred embodiments, the user is not removed from their physical surroundings and immersed in a totally virtual environment. Rather, the user is able to receive additional information via the AR system 120 in a seamless, personalized fashion wherein the information is overlaid on or otherwise augments the user's view or perspective of their existing environment. It is understood that any graphical depictions generated by the augmented display system 300, as described in FIG. 5, may be designed to be displayed and interacted with a number of devices, including user device(s) 130 and AR system 120.

The third party system 140 may be any system that interacts with the other systems and devices of the system environment 100 including, but not limited to, merchant systems, third party data centers, access providers, data storage systems, third party user authentication systems, transaction systems, resource exchanges, web servers, or the like. For instance, in some embodiments, the managing entity system may need to contact one or more third party system(s) 140 in order to access resource accounts and resource exchanges, gain or check regulatory approval for the movement of resources, verify transactions or occurrences on a blockchain, or share user data that may be pertinent to the experience of the user 110 as they interact with the augmented display system 300.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252, an account application 260 which includes account data 262, and other computer-executable instructions or other data. The computer-executable program code of the network server application 240, the managing entity application 250, and/or the account application 260 may instruct the processing device 220 to perform certain logic, data-processing, and data-storing functions of the managing entity system 200 described herein, as well as communication functions of the managing entity system 200.

In one embodiment, the managing entity application 250 includes managing entity data 252. The managing entity data 252 may comprise user authorization-information for one or more users that are employees of or are otherwise associated with the managing entity. The managing entity data 252 may additionally include a list of users, user roles, user access permissions, or other data such as information for establishing secure communication channels with authentication devices, user devices 130, AR systems 120, other entity systems or the like. In some embodiments, the managing entity data 252 further comprises system architecture information, such as resource usage by various devices or virtual machines (e.g., network bandwidth, memory, processing load, or the like), status of machines connected over an entity managed network, status of one or more server(s), status of one or more virtual machine session(s), status of applications, application permissions, identified issues, unauthorized access or unauthorized attempt notifications, or the like.

In one embodiment, the account application 260 includes the account data 262. This account data 262 may include financial account information for one or more users associated with the managing entity system 200, such as customers of the entity. For example, the account data 262 may comprise account numbers, routing numbers, account balances, account rules, account preferences, billing information, credit information, loan information, digital wallet information, authentication information, dynamic resource value information, expected dynamic resource value information, historical and current resource exchange information or the like. In this way, one or more employees of the managing entity system may view user account data, based on their level of access permission, such as during a customer service call, brokerage call, help session, or the like.

The network server application 240, the managing entity application 250, and the account application 260 are configured to invoke or use the managing entity data 252, the account data 254, or the like when communicating through the network communication interface 210 with the augmented display system 300, the one or more user device(s) 130, the AR System 120, and/or the third party system 140 in order to provide access to various information to be displayed on such devices.

FIG. 3 provides a block diagram illustrating the augmented display system 300, in greater detail, in accordance with embodiments of the invention. As illustrated in FIG. 3, in one embodiment of the invention, the augmented display system 300 includes one or more processing devices 320 operatively coupled to a network communication interface 310 and a memory device 330. In certain embodiments, the augmented display system 300 is operated by a first entity, such as a financial institution, while in other embodiments, the augmented display system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the augmented display system 300 described herein. For example, in one embodiment of the augmented display system 300, the memory device 330 includes, but is not limited to, a network server application 340, a resource management application 350 which includes application data 352, an authentication application 360 which includes a authentication data 362 and user data 354, and other computer-executable instructions or other data. The computer-executable program code of the network server application 340, the resource management application 350, and/or the authentication application 360 may instruct the processing device 320 to perform certain logic, data-processing, and data-storing functions of the augmented display system 300 described herein, as well as communication functions of the augmented display system 300.

In one embodiment, the resource management application 350 includes application data 352. The application data 352 may comprise information for storing data or information associated with one or more users, their preferences, or their current application session. The application data 352 may additionally or alternatively include information for comparing data received from third party systems 140, such as resource exchange value information, account information, web services information, or the like, to a stored database (e.g., a relational database) of associated information. In another embodiment, the application data 352 may include resource information, for instance, when the augmented display system 300 receives resource usage information from the managing entity system 200, the resource management application 350 can parse the data and display it via one or more user device(s) 130, or partially display certain sensitive information via one or more AR system(s) 120, based on the user's preferences or permissions.

In one embodiment, the authentication application 360 includes authentication data 362 and user data 364. The authentication data 362 may include passwords, personal identification numbers, security questions, unique biometric information, dynamic two-factor authentication information, system security status, authentication images (e.g., security footage, or the like), stepped-up authentication information (e.g., tiered security information allowing users to access some data, but wherein they must provide additional authentication or verification information to access other, more sensitive information), or other authentication credentials (including secondary or stepped-up authentication credentials) associated with one or more users. This authentication data 362 can be accessed by the authentication application 360 to compare received authentication credentials to the stored authentication credentials when determining whether a user is authorized for viewing certain information, or for determining which information is displayed via one or more AR system(s) 120 automatically as an augmented overlay. For example, all users may see a baseline augmentation of the managing entity system 200 portal or interface, but only certain users who provide stepped-up authorization credentials via the AR systems 120 or user device 130 may receive a fully augmented view of certain information, such as user account information, system resources, system architecture or status, or the like. The user data 364 may comprise any additional information that the authentication application 360 may store for use in authenticating a user (e.g., establishing a contactless NFC chip for a user to authenticate via their user device 130, or the like).

The network server application 340, the resource management application 350, and the authentication application 360 are configured to invoke or use the application data 352, the authentication data 362, and the user data 364, when communicating through the network communication interface 310 with the managing entity system 200, the one or more user device(s) 130, the AR system 120, and/or third party systems 140.

FIG. 4 provides a block diagram illustrating a user device 130 in more detail, in accordance with embodiments of the invention. In one embodiment of the invention, the user device 130 is a mobile telephone, laptop, desktop, or the like. Other types of computing devices may include augmented reality systems, televisions, monitors, smart assistants, or other internet-of-things connected devices, such as standalone cameras, video recorders, audio/video players, GPS devices, wearable devices, electronic kiosk devices, or the like.

Furthermore, it should be known that multiple user device(s) 130 may be owned by or accessed by the user 110 within the system environment 100 of FIG. 1, and these separate user device(s) 130 may be in network communication with each other and the other systems and devices of the system environment 100, such as augmented display system 300, managing entity system 200, and AR system 120. For example, a first user device 130 may comprise a mobile phone of the user 110 that includes an interface for working in concert with a second user device 130 that comprises a personal computer of the user 110 or a AR system 120 of the user 110. For instance, in some embodiments, a first user device 130 may be used for biometric authentication of a specific user, a second user device 130 may act as a desktop or laptop workstation of the specific user, and a AR system 120 may be enabled to augment the details transmitted to be displayed via the first or the second user device 130. As such, any or all of the described components herein with regard to FIG. 4 may exist in the first user device 130, the second user device 130, and so on. In some embodiments, the AR system 120 is considered to be a specialized subset of user device 130, and as such, may contain the same or similar components as described with regard to user device 130.

Some embodiments of the user device 130 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the user device 130. For example, the processor 410 may include a digital signal processor device, a microprocessor device, and various analog to digital converters, digital to analog converters, and/or other support circuits. Control and signal processing functions of the user device 130 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the user device 130 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the user device 130 may be configured to operate with one or more air interface standards, communication protocols, modulation types, and access types. By way of illustration, the user device 130 may be configured to operate in accordance with any of a number of first, second, third, and/or fourth-generation communication protocols and/or the like. For example, the user device 130 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols, fifth-generation (5G) wireless communication protocols, millimeter wave technology, and/or the like. The user device 130 may also be configured to operate in accordance with non-cellular communication mechanisms, such as via a wireless local area network (WLAN) or other communication/data networks, such as a Bluetooth network standard for the short-range wireless interconnection of electronic devices.

As described above, the user device 130 has a user interface that is, like other user interfaces described herein, made up of user output devices 436 and/or user input devices 440. The user output devices 436 include a display 430 (e.g., a liquid crystal display, organic light emitting diode display (OLED), or the like) and a speaker 432 or other audio device, which are operatively coupled to the processor 410. In some embodiments, the display 430 may be a visual projection overlay type display for projection of information on a user's field of vision via a glass or polymer surface worn over the user's eyes. The user input devices 440, which allow the user device 130 to receive data from a user such as the user 110, may include any of a number of devices allowing the user device 130 to receive data from the user 110, such as a keypad, keyboard, touch-screen, touchpad, microphone, mouse, joystick, other pointer device, button, soft key, and/or other input device(s). The user interface may also include a camera 480, such as a digital camera or other optical sensor for receiving data on the user's surroundings. In some embodiments the camera 480 may be used to aid in determining the position of the user's view with respect to the display 434. For instance, the camera may be located at a fixed position with respect to the display 434, and may use image data in conjunction with data received from the positioning system deice/infrared receiver 475 in order to determine location or orientation of the user's gaze, or the location or orientation of one or more AR systems 120. In some embodiments, the AR systems 120 may contain specialized light emitting or infrared light emitting sources that interface with the user device 130.

The user device 130 may also include a positioning system device/infrared receiver 475 that is configured to be used by a positioning system to determine a location of the user device 130. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the user device 130. In other embodiments, the positioning system device 475 includes a proximity sensor or transmitter, such as an RFID tag, infrared receiver, or the like, that can sense or be sensed by devices known to be located proximate to the user device 130, such as one or more AR systems 120. The infrared receiver may be used to track one or more infrared light emitting sources on the AR systems 120 in order to determine the exact orientation and change in orientation of a user's view with respect to the display 434.

The user device 130 further includes a power source 415, such as a battery, for powering various circuits and other devices that are used to operate the user device 130. Embodiments of the user device 130 may also include a clock or other timer 450 configured to determine and, in some cases, communicate actual or relative time to the processor 410 or one or more other devices.

The user device 130 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the user device 130 and/or one or more of the process/method steps described herein. For example, the memory 420 may include such applications as a conventional web browser application 422, or the resource management application 350, or an augmented display enabled application 423. These applications also typically instructions to a graphical user interface (GUI) on the display 430 that allows the user 110 to interact with the user device 130, the managing entity system 200, the augmented display system 300, one or more AR systems 120, or other devices or systems. In some embodiments, the augmented display enabled application may be used by the augmented display system 300 in order to track the user's input via one or more connected peripherals, or the like, and the augmented display system may transmit information to the user device 130 for display via the augmented display enabled application 423, while simultaneously transmitting information designed to overlay the augmented display enabled application 423 to one or more AR systems 120.

The resource management application 421 may comprise an application stored in the memory 420 that is configured to control and/or communicate with the mobile device system 400 to receive data or information (e.g., codes, signals, or the like) from the user device 130. The resource management application 421 may also be configured to communicate information received from the web browser application 422, and/or the augmented display enabled application 423. In some embodiments, the resource management application 421 may be configured to receive instructions from a separate system (e.g., the managing entity system 200, the augmented display system 300, a separate user device 130, and/or a third party system 140, such as a merchant system), and cause one or more components of the user device 130 to perform one or more actions. For example, the resource management application 421 may be configured to receive instructions for generating an alert on the user device 130 via audio or visual signals. The resource management application 421 may also cause the user device 130 to store or erase certain information located in the memory 420 based on executed resource management actions.

The memory 420 can also store any of a number of pieces of information, and data, used by the user device 130 and the applications and devices that make up the user device 130 or are in communication with the user device 130 to implement the functions of the user device 130 and/or the other systems described herein. For example, the memory 420 may include such data as transaction history data, positional data of the user device 130, biometric authentication information for the user 110, device identifiers for one or more other user devices 130, wireless network authentication information, or the like.

FIG. 5 provides a representative depiction 500 to illustrate a dynamically augmented graphical user interface, in accordance with embodiments of the invention. The dynamically augmented graphical user interface 500 may be deployed in a number of different forms, utilizing both user device 130 and AR system 120 in conjunction. As shown in an exemplary embodiment depicted in FIG. 5, the dynamically augmented graphical user interface 500 may include an interface between the display 434 of the user device 130, the augmented display system 300, and the AR system 120, where the information shown on the display 434 is overlayed with additional information of the dynamic augmented display 502 via the user's view of the AR system 120. As shown, the information shown in display 434 may include a list of information, such as "Server 1," "Server 2," "Server N," and so on. It is understood that any number or types of data points for display via the user device 130 may be contemplated by the present invention. For example, in some embodiments, the display 434 may include user account information, system architecture information, third party information, security monitoring information, or the like, and the "Sever" information shown in FIG. 5 is only one exemplary embodiment of the type of information that may be displayed, and later augmented via the dynamic augmented display 502 overlay.

The augmented display system 300 may receive a data stream from the AR system 120 and user device 130 in order to perform various functions in response, including, but not limited to, orienting the user's view via the AR system 120, determining access or authorization credentials of one or more users (e.g., a level of detail which should be shown in the augmented overlay, or the like), determining the user's interaction or focus with regard to the user device 130, and determining the information currently displayed on the user device 130 display 434. In this way, the augmented display system may discern what the user is focused on (e.g., by determining a cursor location, application in the foreground of the display 434, or the like), determine what additional information the user is authorized to view, and determine where in the user's frame of reference the overlaid information should be placed in order to align seamlessly with the display 434 of the user device 130. In some embodiments, the AR system 120 may contain one or more cameras or optical imaging sensors in order to capture and transmit data to the augmented display system 300. In this way, the augmented display system 300 may use a machine learning model (e.g., a convolutional neural network, or the like) to identify and classify image contours and objects within the image data received from the AR system 120, and may transmit overlay images in response to the received and analyzed data.

As shown in dynamic augmented display 502, the overlay of additional information may include sensitive information which requires a specific level of authorization or access permission of the user. For instance, shown in FIG. 5, the overlaid information may include additional information for "Sever 1," while the user's mouse is hovering over the item for "Server 1," and the additional overlaid information may include data such as server location or device address, responsible party or manager of the server, and applications currently active or running on a device session hosted by the server. As the user interacts with the user device 130, perhaps moving the cursor or mouse position to a different server, such as "Server 2," the augmented display system 300 will automatically transmit different additional overlay information for Server 2, such that the user's experience is seamless and near-real-time. As such, the augmented display system 300 may receive a constant stream of data from the user device 130 and the AR system 120 in order to determine the focus of the user, the user's current viewing perspective, or the like, and may alter the information transmitted to the AR system 120 in response to this information.

For instance, in some embodiments, the user's cursor may be placed over "Server 1," but the augmented display system may recognize via data received from a camera on the AR system 120 that the user's gaze is currently not focused on the display 434 (e.g., the user looked down at their desk, turned their head to address a colleague, or the like), and the augmented display system 300 may automatically transmit instructions to the AR system 120 to stop displaying overlay information so that the user's view is not obstructed. When the user returns their focus to direction of view to the display 434, the overlay information may be automatically resumed, and the exact location of the information may be updated at a refresh rate (e.g., such as 30 frames per second, 60 frames per second, or the like) in order that the sequence of overlay frames transmitted to the AR system 120 appears seamless to the user and is able to respond to the user's movements in a seamless fashion.

In order to view sensitive information via the dynamic augmented display 502, the augmented display system 300 may prompt the user to enter authorization credentials, perform a biometric authentication via the user device 130 (e.g., facial scanning, fingerprint scanning, or the like), or complete a two factor authentication process in order to access the augmented display system 300. Based on the user's authentication credentials, the augmented display system may access a database of user accounts on the augmented display system 300, or retrieve such data from the managing entity system 200, and determine permissible information to be transmitted to the specific user based on their authentication level. For instance, a system architect or system administrator may have full privileges to view information related to the status of network components, connected devices, and active programs.

In other embodiments, an employee such as a financial analyst or customer support specialist may have more restricted permission levels with regard to viewing network architecture information and device status information, but may have increased privileges to view sensitive customer account information, or the like. In some embodiments, these permissions and access levels may dynamically change based on the current task that the user is working on, or which application the user is logged in and currently accessing. For instance, the augmented display system 300 may receive data from user device 130 indicating that the user is currently on a phone call with a phone number known to be associated with a particular customer account, is currently actively logged into a session with a customer relationship management program, and may automatically provide authorization to view an augmented display overlay of detailed account information only while the call is active, for a limited period of time thereafter (e.g., in case the call is dropped and needs to be reconnected, or the like), or as long as the user is logged into an active session on the customer relationship management program.

In still further embodiments, the augmented display system 300 may bypass the use of an AR system 120 and instead utilize the user device 130 to display additional overlay information based on authentication or verification of the identity of the user. For instance, if a user is logged into an active session on the user device 130 (e.g., via biometric authentication, username/password authentication, two-factor authentication, or the like), the augmented display system 300 may transmit additional relevant information to the user device that may be useful.

For instance, an executive employee at an entity may receive an email or communication from a particular corporation (e.g., customer, vendor, merchant, or the like), offering to fly the employee out to visit the corporation and survey its newest products. The augmented display system may reference metadata stored on the managing entity system regarding 200 the status of the relationship between the managing entity and the corporation which contacted the executive employee. In some instances, the business relationship between the managing entity and the corporation which contacted the executive employee may be strained, and the metadata may indicate that the managing entity is winding down its business or relationship with the particular corporation.

In some embodiments, the augmented display system 300 may display this metadata or additional information via an overlay, drop down menu, expandable or clickable pop-up window, or the like, on the user device 130 if an active session with an authorized user is confirmed via authentication. In other embodiments, in the interest of increased security or discretion, the augmented display system 300 may transmit the overlay information to a device such as the AR system 120 such that only the executive employee can view such additional information as an overlay via a glasses or headset type device. In this way, the employee may deduce that the email from the corporation may be motivated by an effort to improve a declining relationship.

FIG. 6 provides a process flow 600 for providing a dynamically augmented display overlay, in accordance with embodiments of the invention. As shown in block 602, the process begins whereby the augmented display system 300 receives user interaction data (e.g., cursor location, detected positioning or infrared receiver data, or the like) and application data from user device 130. In some embodiments, this may include the application which is currently active and compatible with the augmented display system 300, as well as the user's current focus within the application. As discussed, this may also include additional information pertinent to the user's level of authentication or tiered access, which may change over time based on the task of the user (e.g., if the user is in an actively authenticated session on the user device 130, if the user is currently responding to a particular customer as indicated by an active phone call, or the like).

As shown in block 604, the system 300 may determine augmented overlay information for one or more items currently being displayed on the user device 130 based on the user interaction data and application data. For instance, if the user's cursor is currently hovering over an item "Server 1" in a diagnostic report or monitoring application, the system 300 may determine that the augmented overlay information should include a drop down menu of additional current status information for "Server 1." Likewise, if the user's cursor is currently hovering over an "account 1" of a particular customer for which they are assisting via a customer relationship management application, the system may determine that additional account details, such as transaction history, account limits, current offers, or the like should be displayed via a drop down menu overlay.

Next, as shown in block 606, the system 300 may receive image data from the AR system 120. The image data may be received in a constant stream of frames, such as a video stream, wherein each frame of the image data is analyzed by the system 300 in order to determine a frame of reference. For instance, the system 300 may receive application data or user interaction data and map the expected display interface of the user device to the image data received from the AR system 120 based on a convolutional neural network processing of the image data (e.g., the system 300 may identify a contour map in the image data that corresponds to a list of servers, and may map this data to the portion of the application data received from the user device in order to determine where the application data is with regard to the AR system 120, and as such, where the application data is displayed in the user's frame of reference), as shown in block 608. Finally, as shown in block 610, the system 300 may periodically update the augmented display overlay information transmitted to the AR system 120 based on the received image data, user interaction data, and application data. In this way, the system 300 may constantly respond to changing information on the user device 130 and constantly respond to changes in the viewers gaze in order to consistently and seamlessly map an overlay of information via the AR system 120.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamically augmented display overlay, the system comprising:
   a memory device; and
   a processing device operatively coupled to the memory device, wherein the processing device is configured to execute computer-readable program code to:
   receive user interaction data and application data from a user device;
   based on the user interaction data and application data, determine augmented overlay information for one or more display items;
   receive image data from a camera of an augmented reality system;
   perform contour analysis of the image data received from the camera of the augmented reality system;
   based on the contour analysis, identify a perspective of the user with respect to the user device;
   locate a user account associated with an active application session on the user device and determine one or more permissions for augmented overlay information based on the user account, wherein determining one or more permissions for augmented overlay information comprises determining permissible information related to a status of one or more network components;
   generate specific augmented overlay information related to a status of the one or more network components, wherein the one or more network components comprise one or more network servers;
   transmit augmented overlay information to the augmented reality system, wherein the augmented overlay information causes the augmented reality system to display overlaid graphical information related to the image data on a display of the user device;
   receive updated user interaction data from the user device, wherein the updated interaction data comprises a current cursor location on the user device;
   determine that the cursor location on the user device coincides with one of the one or more network components; and
   transmit additional augmented overlay information for the one of the one or more network components, wherein the additional augmented overlay information comprises a server device address and a responsible party or manager of the server.

2. The system of claim 1, further configured to determine augmented overlay information for one or more display items based on one or more authentication credentials provided by a user via the user device.

3. The system of claim 1, further configured to:
determine that the cursor location on the user device coincides with a relationship management application; and
display one or more account details such as transaction history, account limits, or account offers.

4. The system of claim 1, wherein the application data further comprises graphical display data.

5. The system of claim 1, further configured to periodically update the transmitted augmented overlay information at a refresh rate of at least 30 frames per second.

6. The system of claim 1, wherein the contour analysis is conducted via a convolutional neural network architecture.

7. A computer program product for dynamically augmented display overlay, the computer program product comprising at least one non-transitory computer readable medium comprising computer readable instructions, the instructions comprising instructions for:
receiving user interaction data and application data from a user device;
based on the user interaction data and application data, determining augmented overlay information for one or more display items;
receiving image data from a camera of an augmented reality system;
performing contour analysis of the image data received from the camera of the augmented reality system;
based on the contour analysis, identifying a perspective of the user with respect to the user device;
locating a user account associated with an active application session on the user device and determine one or more permissions for augmented overlay information based on the user account, wherein determining one or more permissions for augmented overlay information comprises determining permissible information related to a status of one or more network components;
generating specific augmented overlay information related to a status of the one or more network components, wherein the one or more network components comprise one or more network servers;
transmitting augmented overlay information to the augmented reality system, wherein the augmented overlay information causes the augmented reality system to display overlaid graphical information related to the image data on a display of the user device;
receiving updated user interaction data from the user device, wherein the updated interaction data comprises a current cursor location on the user device;
determining that the cursor location on the user device coincides with one of the one or more network components; and
transmitting additional augmented overlay information for the one of the one or more network components, wherein the additional augmented overlay information comprises a server device address and a responsible party or manager of the server.

8. The computer program product of claim 7, further configured to determine augmented overlay information for one or more display items based on one or more authentication credentials provided by a user via the user device.

9. The computer program product of claim 7, further configured to:
determine that the cursor location on the user device coincides with a relationship management application; and
display one or more account details such as transaction history, account limits, or account offers.

10. The computer program product of claim 7, wherein the application data further comprises graphical display data.

11. The computer program product of claim 7, further configured to periodically update the transmitted augmented overlay information at a refresh rate of at least 30 frames per second.

12. The computer program product of claim 7, wherein the contour analysis is conducted via a convolutional neural network architecture.

13. A computer implemented method for dynamically augmented display overlay, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving user interaction data and application data from a user device;
based on the user interaction data and application data, determining augmented overlay information for one or more display items;
receiving image data from a camera of an augmented reality system;
performing contour analysis of the image data received from the camera of the augmented reality system;
based on the contour analysis, identifying a perspective of the user with respect to the user device;
locating a user account associated with an active application session on the user device and determine one or more permissions for augmented overlay information based on the user account, wherein determining one or more permissions for augmented overlay information comprises determining permissible information related to a status of one or more network components;
generating specific augmented overlay information related to a status of the one or more network components, wherein the one or more network components comprise one or more network servers;
transmitting augmented overlay information to the augmented reality system, wherein the augmented overlay information causes the augmented reality system to display overlaid graphical information related to the image data on a display of the user device;
receiving updated user interaction data from the user device, wherein the updated interaction data comprises a current cursor location on the user device;
determining that the cursor location on the user device coincides with one of the one or more network components; and
transmitting additional augmented overlay information for the one of the one or more network components, wherein the additional augmented overlay information comprises a server device address and a responsible party or manager of the server.

14. The computer implemented method of claim 13, further configured to determine augmented overlay information for one or more display items based on one or more authentication credentials provided by a user via the user device.

15. The computer implemented method of claim 13, further configured to:
- determine that the cursor location on the user device coincides with a relationship management application; and
- display one or more account details such as transaction history, account limits, or account offers.

16. The computer implemented method of claim 13, wherein the application data further comprises graphical display data.

17. The computer implemented method of claim 13, further configured to periodically update the transmitted augmented overlay information at a refresh rate of at least 30 frames per second.

* * * * *